May 3, 1927.
J. L. OWENS
1,627,248
HULLER AND SCARIFIER
Filed Aug. 26, 1925 2 Sheets-Sheet 2
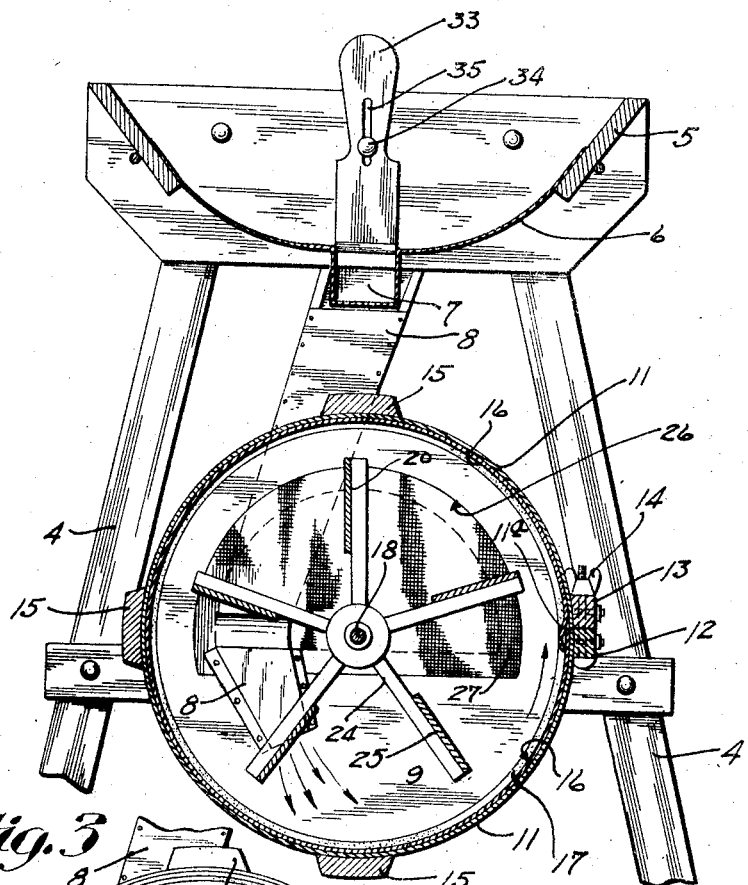
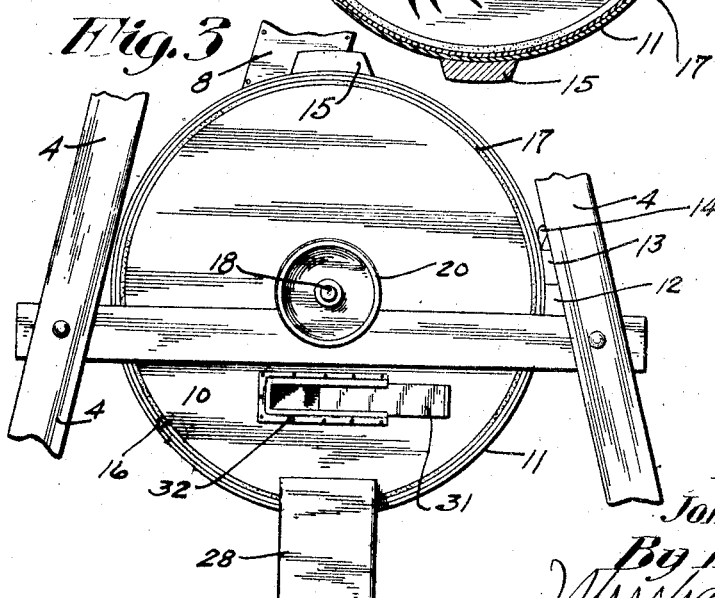
Inventor
John L. Owens
By his Attorneys Patented May 3, 1927.

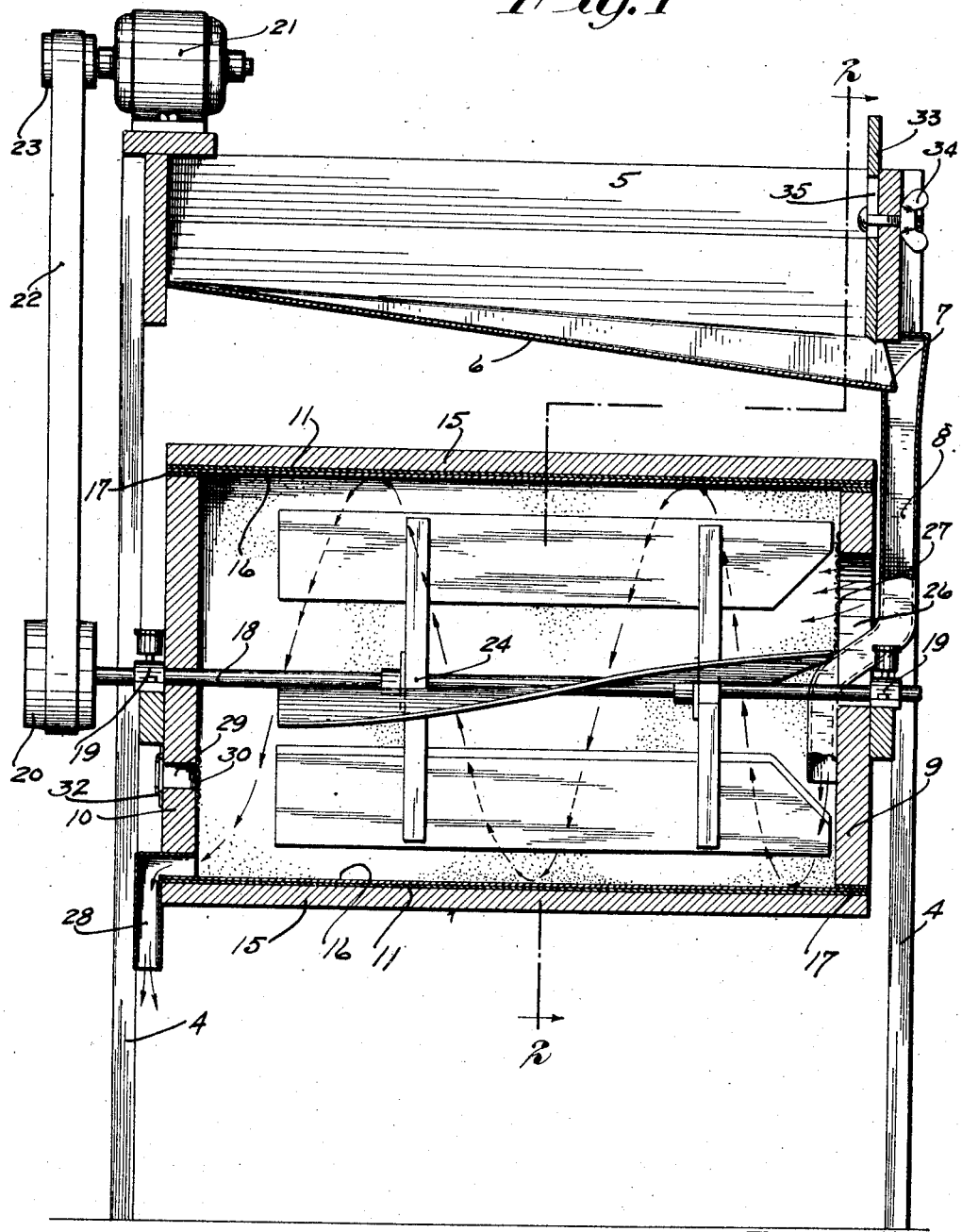

1,627,248

UNITED STATES PATENT OFFICE.

JOHN L. OWENS, OF MINNEAPOLIS, MINNESOTA.

HULLER AND SCARIFIER.

Application filed August 26, 1925. Serial No. 52,543.

My invention provides an extremely simple and highly efficient huller and scarifier and, generally stated, consists of the novel devices, combinations of devices and arrangement of parts hereinafter described and defined in the claims.

The primary purpose of this machine is to remove from hard seeds, such as alfalfa seeds and clover seeds, more or less of the outer seed coat, but the machine is also adapted for the removal of fuzz, beard, and the like from other kinds of seeds.

The outer shell coatings of alfalfa and clover seeds are very hard and substantially waterproof, and such seeds, if planted in their natural condition, will not grow for months, even in wet soil, and in dry soil may not sprout for years. To condition such seeds for planting and quick sprouting, the glazed surface of the shell must be broken or scratched, so that moisture may enter the shell and cause the seed to germinate; and it is for this purpose particularly that my improved huller and scarifier has been designed.

In the accompanying drawings, which illustrate the commercial form of the improved machine, like characters indicate like parts throughout the several views.

Referring to the drawings:

Fig. 1 is a vertical section taken axially and longitudinally through the improved machine;

Fig. 2 is a transverse vertical section taken on the irregular line 2—2 of Fig. 1; and Fig. 3 is a view in elevation, with some parts broken away, looking at the delivery end of the machine.

All of the parts of the machine are mounted directly or indirectly on a suitable framework made up chiefly of laterally spaced trussed end frames 4 tied together by a hopper and a fixed drum, presently to be described. The hopper, as shown, comprises inclined side boards 5 and a sheet metal bottom 6, the ends of the hopper being formed by upper plates of the end frames 4. The boards 5 are rigidly secured to and tie together the upper portions of the two frames 4. The sheet metal bottom portion 6 is formed with a depressed longitudinally inclined discharge trough 7 that delivers into the upper end of the feed spout 8 rigidly secured to the adjacent frame 4. The lower end of the spout 8 is laterally bent and delivers into the scarifying drum. This scarifying drum is in itself of novel construction, and it comprises two heads 9 and 10 and a flexible cylindrical casing 11, preferably of sheet metal. The heads 9 and 10 are rigidly secured, one to each of the frames 4. The casing 11 is split longitudinally at 11$^a$ and to its edges are bolted or otherwise rigidly secured clamping cleats 12 and 13. The cleat 12 is rigidly secured to the adjacent frame 4, and the cleat 13 is loose but adapted to be clamped to the cleat 12 by nut-equipped bolts 14. Longitudinal cleats 15, preferably of wood, are secured to the exterior of the casing 11 and stiffen the same longitudinally. The interior of the cylindrical casing 11 is lined with an abrasive substance, such as "granite paper," emery cloth, sand paper or the like, indicated by the numeral 16. The casing 11 overlaps and surrounds the heads 9 and 10, and, preferably, the abrasive lining sheet 16 is the full length thereof, so that it also laps and surrounds said heads. Preferably, packing strips 17 of pliable material, such as felt, are secured directly to the peripheral surfaces of the two heads 9 and 10, so that, when the casing is clamped around the heads, tight joints will be formed between the heads and the surrounding casing and the abrasive lining sheet will be firmly held in position. With this arrangement, as is evident, the abrasive lining sheet may be replaced from time to time as it becomes worn or too smooth for effective work.

Extended axially through the casing and the heads 9 and 10 is a horizontal shaft 18 journaled in bearings 19 on the frames 4 and, as shown, provided at one end with a pulley 20. The machine illustrated is arranged to be power-driven from a small electric motor 21 mounted on top of one of the frames 4 and power is transmitted to the shaft 18 by a belt 22 that runs over the pulley 20 and over a pulley 23 on the rotor shaft of the motor 21. Within the casing, the shaft 18 is provided with radially projecting arms 24 that carry long fan blades 25. These fan blades are slightly spiral, for an important purpose that will presently appear, and they are set to run quite a distance from the abrasive surface of the casing.

The delivery end of the spout 8 is laterally bent and is extended through an opening 26 in the head 9, so that it delivers into the receiving end of the casing, and here it will be noted that the adjacent ends of the fan blades 25 are beveled so as to clear the said spout. The opening 26 is preferably covered with a wire screen 27. At its lower portion, the head 10 is provided with a discharge passage, into which is set the horizontally bent upper end of a discharge spout 28. Also, as shown, the head 10 is provided above the spout 28 with an auxiliary air discharge passage 29 shown as covered by a wire screen 30 and arranged to be opened and closed more or less by a sliding gate 31 arranged to slide in a flanged U-shaped keeper 32 applied to the head 10.

It will be remembered that the discharge end of the trough 7 delivers into the upper end of the spout 8, and here it should be further noted that this discharge may be regulated by a vertically adjustable gate 33 shown as clamped to the upper portion of the adjacent frame 4 by a nut-equipped bolt 34 that works through a vertical slot 35 in said gate.

For the purpose of illustration, it will be assumed that alfalfa seed is to be treated by the improved machine. This seed will be placed in the hopper 5—6. The fan will then be started into action and the gate 33 opened so as to cause the proper delivery of the seeds into the receiving end of the non-rotary drum, through the spout 8. The seed thus delivered into the drum will, by the action of the fan, be caused to take up a spiral whirling motion substantially as indicated by the arrows marked on Fig. 1. This travel of the seed is not due so much to the direct impact action of the fan blades as it is to the spiral blast of air set up within the casing by the said fan. Obviously, the spiral form of the blades causes the whirling blast of air to travel spirally toward the delivery end of the casing. Under this spirally acting blast, the seed will be uniformly blown and rolled against the abrasive surface and all the while will be caused to progress or travel spirally and longitudinally toward the discharge end of the casing, where they will finally be discharged through the spout 28. In practice, the casing will be of such length and the fan will be operated at such speed that the seeds will be properly scarified and conditioned for planting in one travel through the machine. For proper planting, the hull of the seed should be completely removed, and the shell of the seed should be so scraped or scarified that its moisture-resisting character will be destroyed and the seed will be made to readily absorb moisture. Of course, this process of scarifying or hulling may be carried out to any desired extent and according to the requirements for any particular seed treatment.

The rate at which the seeds will travel through the casing may be varied considerably by adjustments of the air valve or gate 31. The seed will travel through the casing at the greatest velocity and within the shortest time when the port 29 is closed, because then all of the air drawn into the casing through the opening 26 will be discharged with the seeds through the spout 28, but when the port 29 is opened, a part of the air will be discharged through said port and the rate of travel of the seed through the casing will be decreased and the time of the abrasive action on the seeds will be increased.

From the statements above made, it will be understood that I consider broadly new and desire to broadly claim a huller or scarifier comprising a casing lined with abrasive material and combined with means for causing seeds and the like to take up a whirling motion within the casing and against the abrasive surface.

What I claim is:

1. A huller or scarifier comprising a casing lined with an abrasive surface and combined with a rotary fan in the casing for taking up seeds or the like and throwing the same with a whirling motion into the blast of air produced by the fan and against said abrasive surface.

2. A huller or scarifier comprising a casing lined with an abrasive surface and combined with a rotary fan in the casing for taking up seeds or the like and throwing the same with a whirling motion into the blast of air produced by the fan and against the abrasive surface, said fan and the blast of air produced thereby causing said seeds and the like, during their whirling motion, to take a spiral course through the casing.

3. A huller or scarifier comprising a casing lined with an abrasive surface and provided at one end with an inlet passage and at its other end with an outlet passage, and a gate-controlled auxiliary air discharge passage combined with a rotary fan in the casing for taking up seeds or the like and throwing the same with a whirling motion into the blast of air produced by the fan and against the abrasive surface, said fan and the blast of air produced thereby causing said seeds and the like, during their whirling motion, to take a spiral course through the casing.

4. In a huller or scarifier, a casing comprising fixed heads and a split casing clamped onto said heads, an abrasive sheet lining said casing and thereby clamped against said heads, said casing at one end having an inlet passage and at its other end a discharge passage, and means working within said casing and arranged to cause seeds or the like to take up a whirling motion within said casing and against said abrasive sheet, the said heads having applied around the peripheries thereof pliable packings against which said abrasive sheet is directly clamped by said casing.

In testimony whereof I affix my signature.

JOHN L. OWENS.